United States Patent [19]

Wortman

[11] 3,741,635

[45] June 26, 1973

[54] SPECTACLE POSITIONING AND SECURING DEVICES

[76] Inventor: Stanley Wortman, 3623 Stettinius Avenue, Cincinatti, Ohio 45208

[22] Filed: Nov. 1, 1971

[21] Appl. No.: 194,433

[52] U.S. Cl. ................................................. 351/123
[51] Int. Cl. ............................................ G02c 5/14
[58] Field of Search ..................... 351/123, 120, 158

[56] References Cited
UNITED STATES PATENTS

| 1,533,190 | 4/1925 | Jirasek | 351/123 |
| 3,503,676 | 3/1970 | O'Neill | 351/123 |

FOREIGN PATENTS OR APPLICATIONS

| 732,189 | 2/1943 | Germany | 351/123 |

Primary Examiner—Ronald L. Wibert
Assistant Examiner—Paul A. Sacher
Attorney—James S. Hight, Bruce Tittel et al.

[57] ABSTRACT

The invention teaches the use of an adjustable hook means adjustably secured to the temples of spectacles. The hook means being adapted to hook on to the forward helix of the ears of a person and fix the distance between the helix and the bridge of the nose of a person and thereby prevent the spectacles from sliding on the bridge of the nose of the person wearing the spectacles.

3 Claims, 13 Drawing Figures

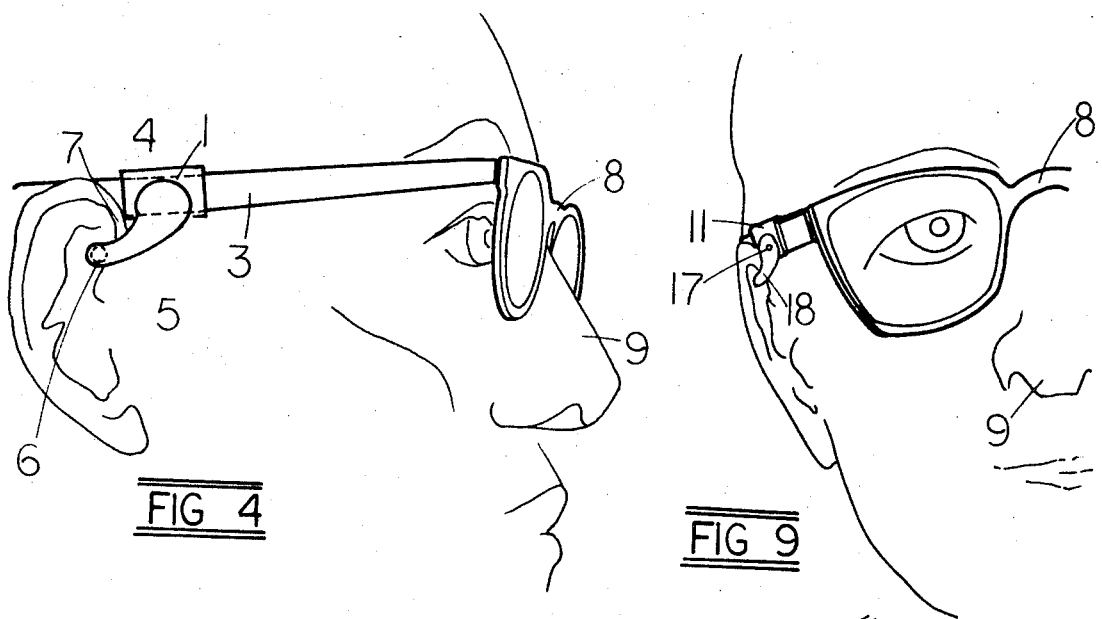
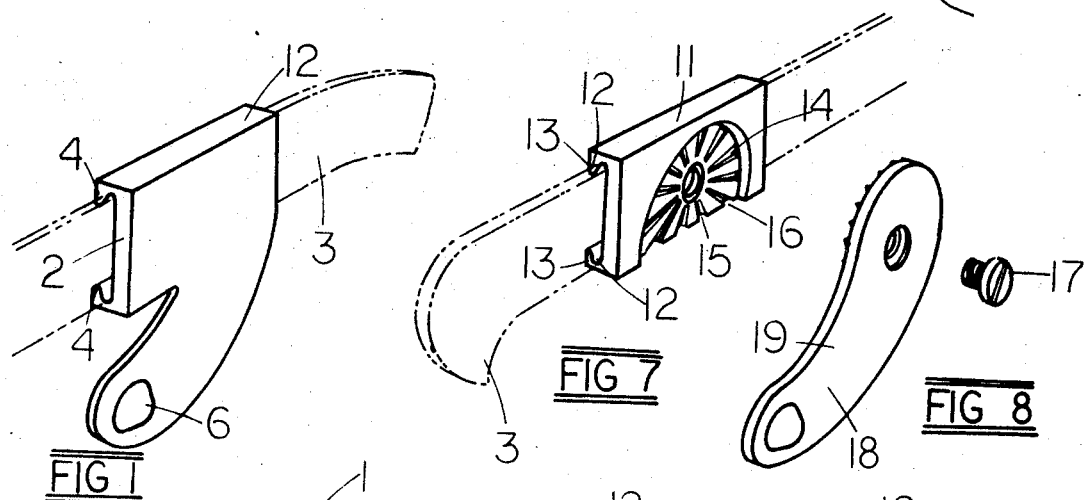
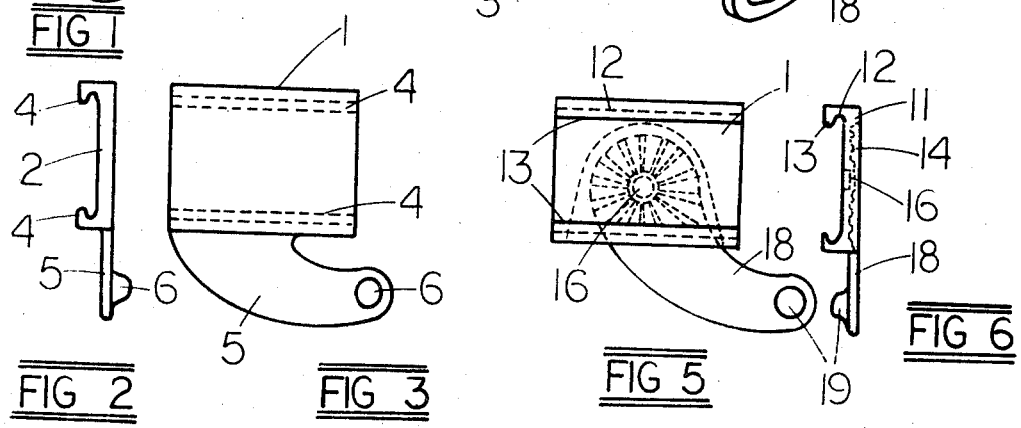
STANLEY WORTMAN
INVENTOR

STANLEY WORTMAN
INVENTOR

BY George A. Schwenger
ATTORNEY

SPECTACLE POSITIONING AND SECURING DEVICES

The devices presently in use do not continuously prevent spectacles from sliding out of focus on the person wearing them. These devices depend upon friction and springs to hold the spectacles in fixed position on a person. Continuous placement and removal causes the decrease in friction and also loss of tension in the spring devices. This necessitates a person to keep pushing the spectacles back in proper position and focus on the bridge of their nose.

It is an object of my invention to provide a means that is frictionally and slidably secured to the temples of spectacles so that a hook on the said means can be positioned to hook on the forward part of the helix of the ear of the person and fix the distance between the bridge of the spectacles and helix of the ear and thereby prevent the spectacles from sliding down on the nose of a person.

Another object of my invention is to provide an adjustable means to prevent spectacles from sliding out of focus on the nose of a person whereby said adjustable means can be positioned and adjusted by the person wearing the spectacles.

A further object of my invention is to provide an adjustable hook means that is supported on an adjustable bracket that is slidably supported on the temples of spectacles.

A further object is to provide a hook means that is integral and fixed on the temples of spectacles to hold the spectacles in a fixed position on the bridge of the nose of a person wearing the spectacles.

These and other objects of my invention will become apparent to persons skilled in the art from the description and the drawings illustrating the preferred embodiments of my invention.

In the drawings:

FIG. 1 is a perspective view of one form of my Spectacle Positioning and Securing Device wherein a hook member is cast integral with a boss for securing the device to the temple of a spectacle.

FIG. 2 is an end view in elevation of the Spectacle Positioning and Securing Device with the hook member integral and fixed to the boss.

FIG. 3 is a side view in elevation of the Spectacle Positioning and Securing Device shown in FIGS. 1 and 2.

FIG. 4 is a perspective view illustrating how the Positioning and Securing Device is worn by a person.

FIG. 5 is a side view in elevation of an alternate Positioning and Securing Device wherein the hook means is adjustable in relation to the boss that supports the hook means.

FIG. 6 is an end view in elevation of the alternate Positioning and Securing Device illustrated in FIG. 5.

FIG. 7 is a perspective view of the boss of the alternate Positioning and Securing Device shown in FIGS. 5 and 6 with the hook detached from the boss.

FIG. 8 is a perspective view of the hook means for the alternate Positioning and Securing Device illustrated in FIGS. 5 and 6 detached from the boss.

FIG. 9 is a perspective view of the alternate Positioning and Securing Device secured on temples of spectacles positioned on a person wearing the spectacles.

Figure 13:
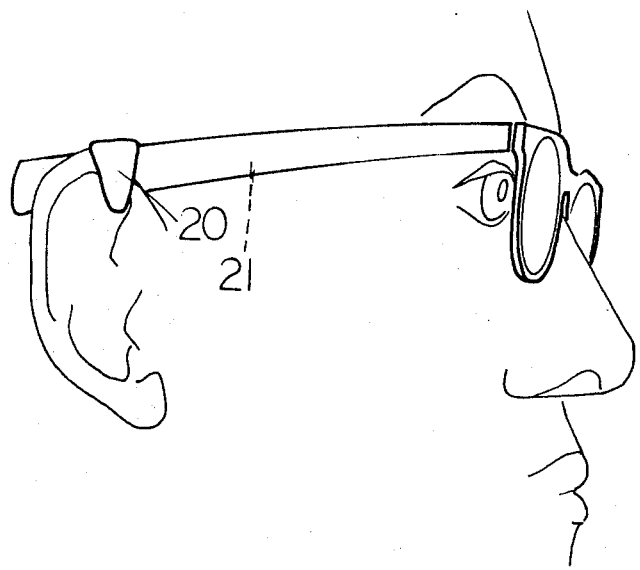
FIG. 13 is a side view of a head of a person wearing my Positioning and Securing means illustrated in FIG. 10.

Referring to FIGS. 1, 2 and 3 there is illustrated one form of my Positioning and Securing Device. This form requires right and left units that will be frictionally engaged on the right and left templets of spectacles. They consist of an elongated flexible boss 1 having open slots 2 for receiving templets of spectacles 3. Integral with the boss and overhanging the slot is an overhanging lip 4 adapted to clamp around the templet and thereby frictionally and slidably clamp the positioning and securing device along the templet of a spectacle. Integral with the boss there is a backsweeping arm 5 upon which is fixed a node 6. The node extends outward from the arm 5 and forms a hook that is adpated to be inserted against back side 7 of a helix of the ear of a person wearing the spectacles. When bridge 8 of the spectacles is in place on the nose of a person the Positioning and Securing means is spotted on the templets so that the node 6 will be comfortably secured in the helixes of the ears of the person. This fixes the distance between the bridge of the spectacles and the nodes in the ears of the person and thereby prevent the glasses from slipping down on the nose of the person and hence the lenses of the spectacles are kept in focus for the person wearing the glasses.

While this particular type of Positioning and Securing Device illustrates a backsweeping arm it will readily occur to one skilled in the art that the arm can be perpendicular suspended to the boss and accomplish the same result as the backsweeping arm. The advantage of the perpendicular suspended arm is that the same unit will work right and left templets.

Referring to FIGS. 5, 6, 7 and 8 there is illustrated an alternate form of my Positioning and Securing device. This form, like the previous form described, requires right and left units. In this form there is an elongated flexible boss 11 having a slot 12 for receiving a templet of spectacles. Integral with the boss and overhanging the slot there is an overhanging lip 13 adapted to clamp around the templets of spectacles and thereby to frictionally and slidably clamp the Positioning and Securing device along the templets of the spectacles. The boss 11 has a countersink portion 14, half circular in form, with radiant indentations 15 and a tapped screw hole 16 for a tightening screw 17. A backsweeping arm 18 adapted to be rotatably secured in the countersink 14 has a projecting node 19 for adjustably hooking behind the helix of the ear of a person wearing the spectacles. This backsweeping arm provides for adjustment of the node in relation to the boss of this particular embodiment of my Positioning and Securing means for spectacles. It allows the wearer to adjust the node and place it in a comfortable position in relation to the helixes of the ears.

Figure 10:
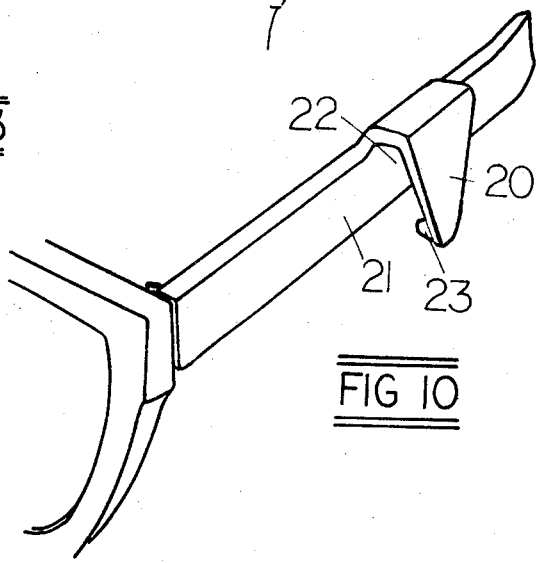
FIG. 10 is a perspective view of another form of my Positioning and Securing Device whereby the hook means is fixed and molded integral with the temples of spectacles.
Figure 11:
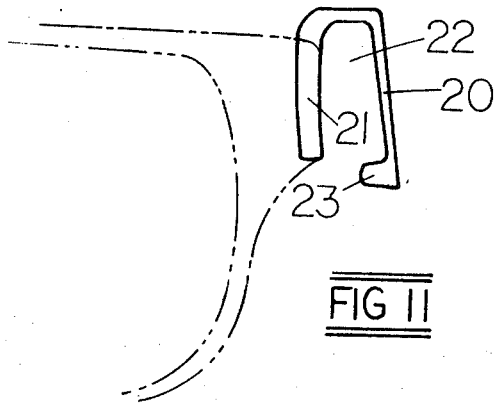
FIG. 11 is an end view in elevation of my Positioning and Securing means illustrated in FIG. 10.
Figure 12:
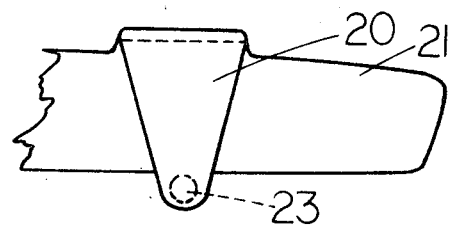
FIG. 12 is a side view in elevation of my Positioning and Securing means illustrated in FIG. 10.

Referring to FIGS. 10, 11 and 12 there is another embodiment of my invention which teaches the use of my Positioning and Securing device by fixing it on the right and left templets of spectacles. This embodiment has a spaced overhanging bracket 20 molded integral with the templet 21. A space 22 is provided for clearance to receive the helixes of the ears of a person. Projecting outwardly from the bracket 20 there is a node 23 adapted to be hooked on the helixes of the ears of the person wearing the spectacles. With this particular embodiment the position of the bracket and node is determined by an oculist. Templets will be selectively chosen by the oculist and assembled to the lenses of the spectacles. This will insure a permanent fix of the distance between the bridge of the nose and helixes of the person and thereby insure continuous proper position of lenses of the spectacles on a person.

To utilize my device as illustrated in FIGS. 1, 2 and 3, the bosses are slidably secured to the templets of spectacles. The spectacles are placed on a person and the bosses are then moved along the templets until the nodes hook onto the helixes of the ears of a person so that the space between the bridge of the spectacles and the helixes of the ears become fixed and hence will hold the spectacles in proper focus on the person wearing the spectacles. Where the backsweeping arm is adjustable there is an added convenience whereby the Positioning and Securing node can be adjusted to compensate for the variation in the forms of the helixes of the ears as they occur from person to person.

Having thus described and illustrated my invention, I claim:

1. An attachment for templates of spectacles to maintain said spectacles in a fixed position on the nose of a wearer of said spectacles comprising:

a boss attached to each template, each boss including an arm bearing a terminal portion which in use is in a position below the top of the ear of the wearer, each terminal portion having a node thereon which in use extends inwardly from the boss into the wearer's ear, said node abutting against the helix of the ear of the wearer when in use and serving to retain the spectacles in a fixed position without the use of any substantial pressure directed inwardly against the ear further including rotating means for connecting said arm to said boss so that said arm may be rotated with respect to said boss.

2. The attachment of claim 1 wherein said rotating means includes a semicircular countersink portion in the boss, radiant indentations in said countersink portion, a threaded screw hold in said countersink portion, teeth on said arm adapted to engage said radiant indentations, a hole in said arm, a screw adapted to be inserted through the hole in said arm and into said tapered screw hole whereby said arm may be screwed to said boss.

3. The attachment of claim 2 wherein sliding means attach said boss to said template to permit sliding movement of the boss.

* * * * *